United States Patent [19]
Shimogama et al.

[11] Patent Number: 5,650,079
[45] Date of Patent: Jul. 22, 1997

[54] WELDING POWER SOURCE

[75] Inventors: Shigeru Shimogama, Kawanishi; Toshinori Hongu, Nishinomiya, both of Japan

[73] Assignee: Matsushita Electric Industrial Co., Ltd., Kadoma, Japan

[21] Appl. No.: 550,932

[22] Filed: Oct. 31, 1995

[30] Foreign Application Priority Data

Oct. 31, 1994 [JP] Japan ................................. 6-266950

[51] Int. Cl.[6] .............................................. B23K 9/095
[52] U.S. Cl. .............................. 219/130.21; 219/124.34; 901/42
[58] Field of Search ............................ 219/124.34, 125.1, 219/137.71, 130.21; 901/42

[56] References Cited

U.S. PATENT DOCUMENTS

| 4,249,062 | 2/1981 | Hozumi et al. | 219/124.34 |
| 4,538,047 | 8/1985 | Nakano et al. | 219/124.34 |
| 5,264,677 | 11/1993 | Sato et al. | 219/124.34 |

FOREIGN PATENT DOCUMENTS 2-179361  7/1990  Japan.

*Primary Examiner*—Clifford C. Shaw
*Attorney, Agent, or Firm*—Ratner & Prestia

[57] ABSTRACT

An arc welding system includes a welding power source unit for producing welding power for fusing welding wire to weld a workpiece. An internal resistor is incorporated in the welding power source unit. A relay is inserted between the internal resistor and the welding power source unit for switching a connection therebetween according to the operating condition of the arc welding system. The relay connects the internal resistor and the welding power source unit only while the arc welding system is performing a welding operation.

8 Claims, 8 Drawing Sheets

WELDING POWER SOURCE

BACKGROUND OF THE INVENTION

1. Field of the Invention

The present invention relates to a welding power source and, more perticularly, to a welding power source for an arc welding system utilizing an industrial robot.

2. Description of the Prior Art

In FIG. 7, an example of conventional arc welding system unitizing an industrial robot such as being proposed in Japanese Laid-Open Patent application No. H2-179361 is shown. This welding system Wc includes a robot body 700, a control unit 100 for the control of the robot 700, a wire contact detector 2600, and a welding power source unit 200. The robot body 700 has a welding torch 600 for supporting and feeding a welding wire 400 in the correct position above a work 900 to join thereof.

In this type of arc welding system, a DC voltage (not welding power) applied between the welding wire 400 and the work 900 greatly reduces when the wire 400 contacts with the work 900. Such voltage reduction is detected by the wire contact detector 2600, and is compared with a reference voltage by an comparator 1700 (FIG. 8). Based on this comparison result, a "wire contact" representing such a condition on which the wire 400 contacts with others can be detected.

Utilizing thus detected "wire contact" condition, it is possible to sense conditions of "work position", "wire sticking", and "torch contact". "Work position" represents the degree by which the work 900 is out of the correct welding position. "Wire sticking" represents such a condition on which the welding wire 400 stuck to the work 900 even though the welding operation has finished. "Torch contact" represents such a condition on which the welding torch 600 contact with the work.

The welding power source unit 200 produces a welding power by transforming three phase power supplied from the externals. These transformed power is further rectified by diodes 2000. The output of these diodes 2000 are connected to the robot 700 by lines 2100 and 2200 via relay CRb. This relays CRb is controlled by the controller 100 that is also connected to the detector 2600 by a line 2400 and to the robot 700 by a line, as best shown in FIG. 7.

An internal resistance 1300 having one end connected to the line 2200 and other end connected to a select switch 2901 incorporated in the detector 2600 by a line 2300 is provided. The select switch 2901 selectively selects either one of line 2300 and a line connected to a high DC voltage source 2900 also incorporated in the detector 2600 based on a command given by the controller 100 through the line 2400. Thus produced welding power is supplied to the robot 700 through lines 2100 and 2200. Relay CRb are inserted in the lines 2100 and 2200 before the internal resistance 1300. This relay CRb is actuated by the controller 100 through a signal line 2650.

In FIG. 8, the construction of wire contact detector 2600 is shown schematically. A positive voltage of the DC power is applied to the output line 2100 on a cathode side of diode 2000, wherein this line 2100 is referred to as "torch cable" hereafter. The voltage detected on the torch cable 2100 varies, depending on whether the welding wire 400 contacts with the work 900, or not. The difference of voltage between when the welding wirer 400 contacts with the work 900 and when welding wire 400 does not contact with the work 900 is detected as a "detection voltage." This detection voltage is compared with the reference voltage by the comparator 1700 for sensing the above described conditions.

The controller 100 includes a robot control unit 2500 incorporated therein for controlling the robot 700. The robot control unit 2500 has a wire contact detector switching relay 1100, a wire contact detection start relay 1200, and welding start relay 1300. The relay 1100 is connected to relays MS and CRb1 in the detector 2600, and closes on receipt of a wire contact detection circuit switching signal Ssw from the controller 100. The relay 1200 closes on receipt of a wire contact detection start signal Swc from the controller 100. The relay 1300 is connected to a relay CRb in the detector 2600, and closes on receipt of a welding starting signal Sws from the controller 100. The robot control unit 2500 also watches the voltage between a relay CRa1 in the The welding power source unit 200 includes the internal resistance 1300 connected between the torch cable 2100 and a base metal cable 2200, wherein the internal resistance 1300 is a bleeder and is functioning as a welding voltage detector. When a DC voltage is applied with the torch cable 2100 with the wire 400 that is not in contact with the work 900, an electric current flows through the resistance 1300. In this time, the DC voltage is divided by resistances 1300 and 1400, and thus divided voltage is input to the comparator 1700.

However, when the wire 400 is in contact with the work 900, the both ends of internal resistance 1300 are connected to each other through the torch cable 2100, work 900, base metal 800, and base metal cable 2200 each having impedance. Therefore, the DC voltage is divided by the internal resistance 1300, a parallel resistance component of the torch cable 2100 that is short, and the resistance 1400, respectively. Thus divided voltage at a Junction point 1500 is input to the comparator 1700. As a result, the voltage input to the comparator 1700 is different from that when the wire 400 and work 900 are not in contact with each other. This difference in input voltage causes the comparator 1700 to output different results. In consideration of this, an adjustable resistor 1600 is provided for adjusting a threshold of the comparator 1700. This threshold corresponds to the reference voltage of the comparator 1700, as described above.

However, the lengths of the torch cable 2100 and the base metal cable 2200 are variably determined according to the applicable conditions, and are not fixed. Also the surface condition of the work 900 are subject to the presence and quality of surface treatment or oil film coating. The ambient temperature of these components are not constant. These factors affect the impedance of the components. As a result, the overall resistance of those components are not stable.

In addition to this, the internal resistance 1300 that is usually comprised of a resistor having about 100 ohm resistance is subject to the ambiences. The input voltage for the comparator 1700 varies furthermore.

On the other hand, the current flowing when the wire 400 contacts with the work 900 should be limited to some mA for preventing an electric shock. Although the resistance value required for this purpose is determined by the DC voltage applied to the torch cable 2100, the resistance 1400 should be greater than some tens KΩ generally. Due to this greater resistance, the adjustable range for the reference voltage of the adjustable resistor 1600 is very narrow. In addition to this narrow adjustable range, the various factors also affect the overall impedances. Then, the wire contact detector 2600 can not detect the "wire contact" correctly.

Referring back to FIG. 7, a switching mechanism provided to solve this problem is shown. This switching mechanism uncouples the internal resistance 1300 from the welding power supply circuit only when a high DC voltage is applied between the work 900 and welding wire 400. In welding operation, the internal resistance 1300 should be connected and disconnected so frequently. Therefore, a relay contact can not used for uncoupling use, because the relay contact will wear out so rapidly, resulting in a shorter service life of the welding system itself.

To avoid such shorter service life due to relay contact, this switching includes the select switch 2901 for uncoupling the internal resistance 1300 from the power source unit 200 during the contact detection. Specifically, only when a high DC voltage is applied between the work 900 and welding wire 400, the select switch 2901 actuates the selector S to remove from the internal resistance 1300 (line 2300). It is to be noted that this switching mechanism requires the signal line 2300 instead of the relay contact.

Therefore, the operator is required to additionally work to wire this signal line 2300 at site when installing the arc welding system. Such work is originally unnecessary if relay is incorporated in the system for the use of uncoupling the internal resistance 1300.

Furthermore, in such a welding robot system with an arc welding sensor (not shown in FIG. 7), a resistor used for the detection of welding voltage, incorporated in the arc welding sensor, is connected to a positive terminal 2700 and a negative terminal 2800 of the power source unit 200. Thus, a circuit is formed by the resistance 1300, causing a voltage drop even when the wire 400 and work 900 are not in contact with each other. In this case, the welding sensor works in error.

It is also to be noted that one end of the internal resistance 1300 is connected to the select switch 2901 that is connected to the torch line 2100, as shown in FIG. 7. Therefore, when the selector S is mis-operated, high voltage of welding power may be connected to the positive side of the system during the welding operation, it is very dangerous.

Furthermore, the wire contact detector 2600 should be independently provided, separately from the controller 100, the welding power source unit 200, and the robot 700, as shown in FIG. 7. The welding system itself needs broader area for installation and operation, and results in increased manufacturing cost. It is needless to say that it will take more cost if this detector 2600 is forcibly incorporated in any of other parts for the space saving.

In FIG. 9, the welding start signal Sws and the wire contact detection start signal Swc observed in a conventional arc welding system are shown. Specifically shown, a high level period Pa of the wire contact detection start signal Swc is completely included in a high level period Pw of the welding start signal Sws. This means that the wire contact detection voltage is applied in error to the lines where the welding power current are flowing, causing a hazardous situations such as burning of components of the welding system.

SUMMARY OF THE INVENTION

The object of the present invention is therefore to provide a welding power source which solves these problems.

The present invention has been developed with a view to substantially solving the above described disadvantages and has for its essential object to provide an improved welding power source.

In order to achieve the aforementioned objective, a welding power source for use in a welding system for welding a work by fusing a welding wire comprises a power source means for supplying said welding wire and said work with an electric power strong enough to fuse said welding wire; a resistance means connected to said power generator means; and a coupling means provided between said resistance means and said power generator means for coupling therebetween only while said welding system is being in welding operation.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
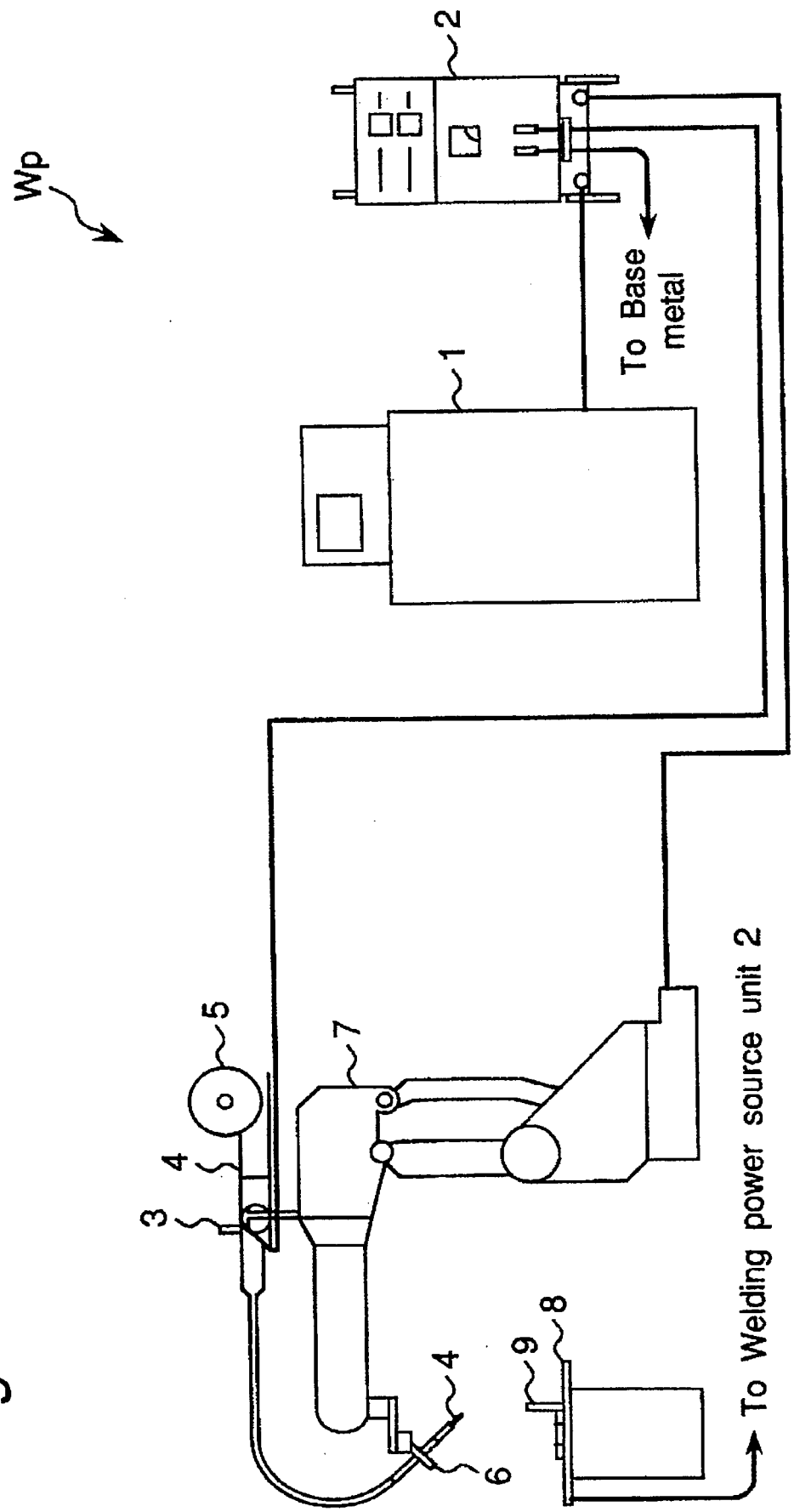
FIG. 1 is an illustration showing a layout of a welding system according to the present invention.

Referring to FIG. 1, an arc welding system according to the present invention is schematically shown. The arc welding system Wp includes a robot body 7 which performs the welding operation according to an operation program. A control unit 1 is provided for inputting such an operation program. A welding power source unit 2 is provided for supplying the welding system Wp with an electric power required for welding operation.

The robot 7 is provided with a wire feeder 3 on the robot 7 for feeding a welding wire 4 in both obverse and reverse directions. A wire reel 5 is provided for storing the wire 4 as wound therearound. A welding torch 6 is provided for supporting the welding wire 4 at a predetermined position over a work 9 and a base metal 8.

According to the operation program made by means of the controller 1, the robot 7 performs various welding operations, and also detects an arc current during the welding operation. Based on this detected arc current, operating conditions of the welding system Wp are judged such as, whether welding operation should be continued or not, and whether there is any problem occurring or not.

Figure 2:
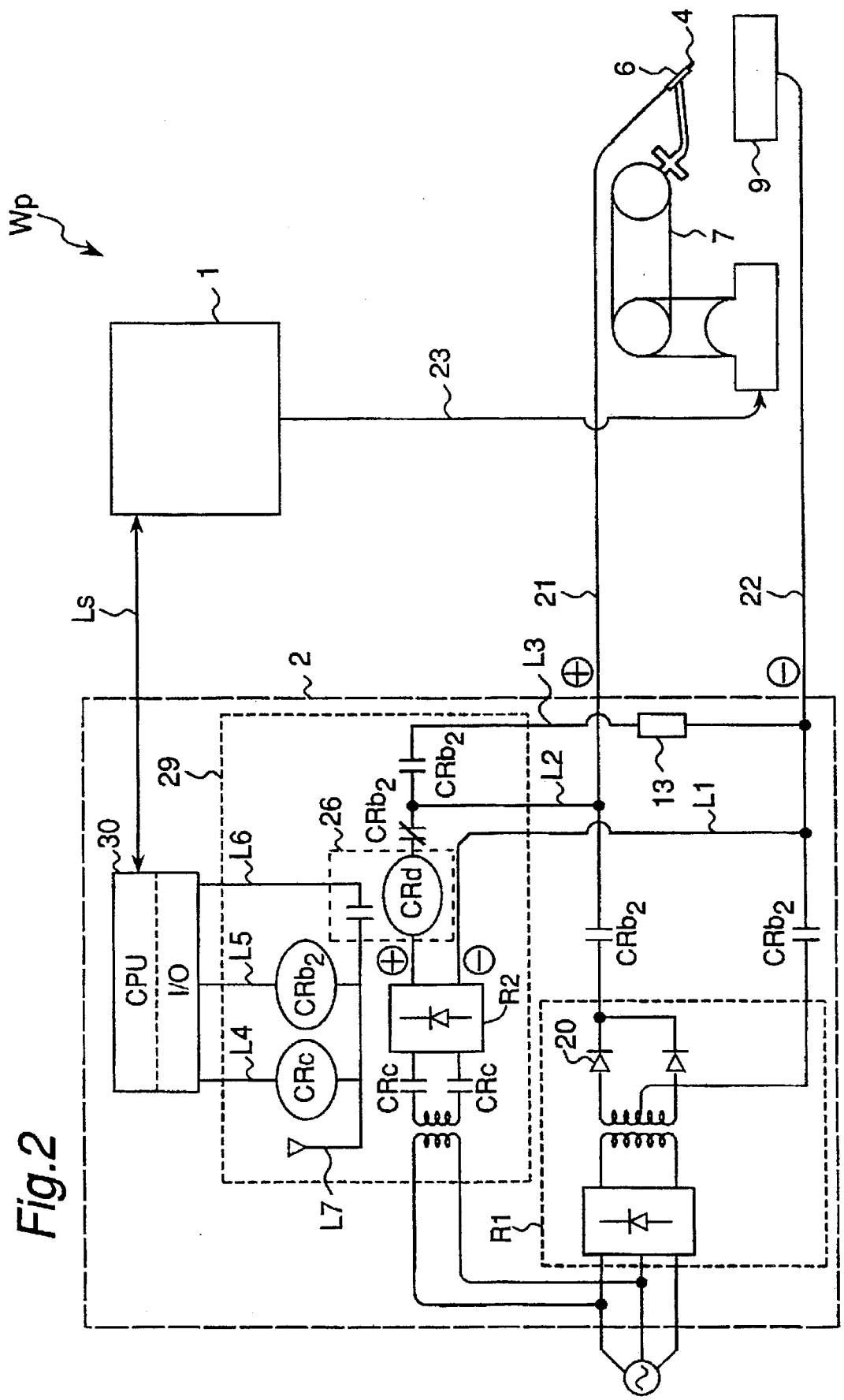
FIG. 2 is a block diagram showing the arc welding system of FIG. 1.

Referring to FIG. 2, a block diagram of the arc welding system Wp of FIG. 1 is shown. The control unit 1 has a first controller 25 (FIG. 3) incorporated therein, and is connected to the robot 7 by a line 23 for transferring control signals. As these control signals, a "welding start signal Sws" instructing the start of welding operation and a "wire contact detector switching signal Ssw" are included for example. The control unit 1 is further connected to the welding power source unit 2 by a serial signal line Ls for exchanging various data, including the welding start signal Sws, therebetween.

The welding power source unit 2 has a main rectifying unit R1 connected to an external power source, three phase AC fore example, for generating a great power required for welding the work 9 to the base metal 8 with the welding wire 4. Therefore, thus great power is referred to as a "welding power". The main rectifying unit R1 is preferably comprised of an inverter unit, a transformer, and diodes 20, as shown in FIG. 2.

This rectifying unit R1 has a positive output terminal on the cathode side of the diodes 20 and a negative output terminal on the side of transformer. The positive terminal is connected to the torch 6 of the robot 7 by a line 21 via a relay CRb provided inside the power source unit 2. The negative terminal is connected to the work 9 by a line 22 via the relay CRb. Hereinafter, the lines 21 and 22 are referred to as a "torch cable" and a "work cable", respectively. Thus, the welding power supply to the welding wire 4 in the torch 6 of the robot 7 can be controlled by switching the relay CRb.

The welding power source unit 2 further has a sub rectifying unit R2 also connected to the external power source, two-phase AC, for producing a control power required for the operation of control devices in the power supply unit 2. A relay CRc is inserted between the external power source and the sub rectifying unit R2. Thus, the external power supply to the sub rectifying unit R2 can be controlled by switching the relay CRc.

The sub rectifying unit R2 has a positive output terminal connected to the torch cable 21 by a line L2, wherein relays CRd and CRb2 are inserted in series. The relay CRb2 is further connected to the work line 22 by a line L3, wherein a contact CRb2 of the relay CRb and an internal terminal 13 are inserted in series. Note that the internal terminal 13 are uncoupled from and coupled to the welding power circuit by switching contacts CRb1 and CRb2 of the resistance uncoupling relay CRb. In this sense, the relay CRb is referred to as a "resistance uncoupling relay" hereafter. The sub rectifying unit R2 has a negative output terminal connected to the work cable 22 by a line L1.

The welding power supply unit 2 further includes a second controller 30 connected to the first controller 25 inside the control unit 1 by the signal line Ls. The second controller 30 is preferably comprised of a CPU and I/O unit, and is connected to relays CRc, CRb2, and CRd by lines L4, L5, and L6, respectively. A diode is also connected to these relays through a line L7.

In thus constructed welding power source unit 2, the second rectifying unit R2, relays CRb2, CRc, and CRd forms a high voltage power source 29. The relay CRd forms a wire contact detector 26. The operation of the wire contact detector 26 and the high voltage power source 29 will be bellow.

Figure 3:
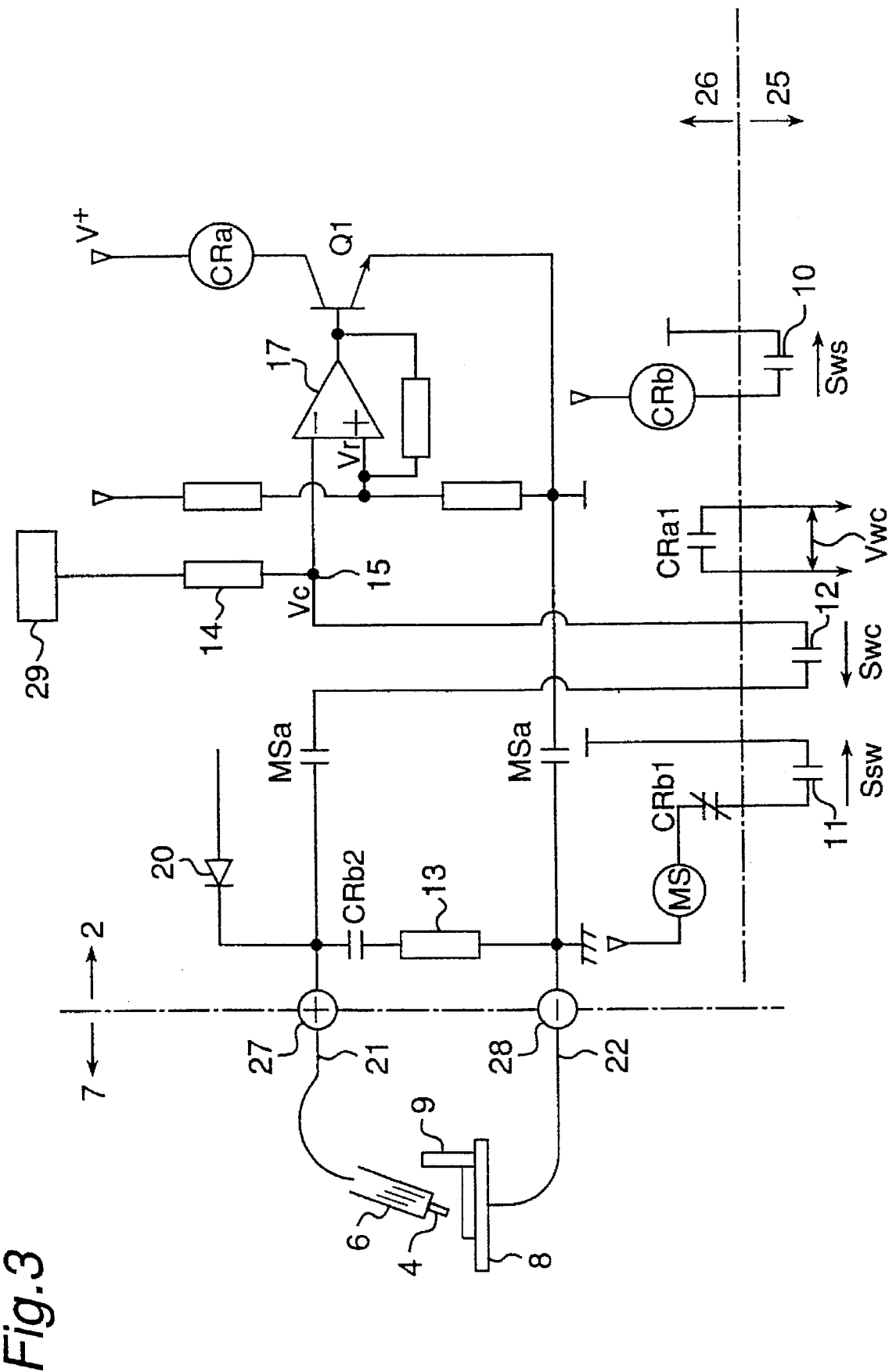
FIG. 3 is a schematic diagram showing the essential portions of the arc welding system of FIG. 2.

Referring to FIG. 3, the essential parts of the arc welding system of FIG. 2 is shown schematically. A welding start contact 13 is provided for switching a relay CRb based on the welding start signal Sws from the first controller 25. A wire contact detector switching contact 11 is connected to a relay MS through a contact CRb1 of the relay CRb. Therefore, the relay MS is switched based on the welding start signal Sws and the wire contact detector switching signal Ssw.

A positive terminal 27 and a negative terminal 28 are provided in the torch cable 21 and the work cable 22, respectively, for the connection of robot 7 and the welding power source unit 2. The torch cable 21 is provided with a contact MSa of the relay MS and a contact 12 inserted therein in series. Similarly, the work cable 22 is provided with the relay contact MSa inserted therein.

An comparator 17 having a reversed input terminal connected to the torch cable 27 is provided. The comparator 17 has another input terminal connected to the work cable 22 and to other members, as best shown in FIG. 3. The comparator 17 compares a first input from the torch cable 21 with a second input from the other terminal, and outputs a comparison result to a transistor Q1. This comparison result becomes a high when the first input is smaller than the second input, and makes the transistor Q1 to turn ON.

The transistor Q1 is a switching transistor having an input terminal connected to a predetermined voltage V+ via a relay CRa and an output terminal connected to the work cable 22. On receipt of the high signal from the comparator 17, the transistor Q1 makes the relay CRa to turn on. Accordingly, a voltage Vwc applied to a line having a contact CRa1 of the relay CRa inserted therein reduces, so that the first controller 25 detects this drop of voltage Vwc as a signal indicating that the wire 4 and work 9 are in contact.

The internal resistance 13 is inserted between the torch cable 21 and the work cable 22. On end of the resistance 13 is connected to the torch cable 21 through a relay contact CRb2 and further to the diode 20. Another end of the resistance 13 is connected to the work cable 22 and further to the ground.

The high voltage source 29 is connected to the torch cable 21 by a line with a junction point 15. A resistance 14 is inserted between the high voltage source 29 and the junction point 15. The high voltage source 29 applies a high DC voltage between the welding wire 4 and the base metal 8 at a predetermined timing except for the period of the arc welding operation. Utilizing the voltage drop due to the contact of wire 4 and work 9, as described in the above, the wire contact detector 26 detects the "wire contact" condition.

Sensing the "work position" by moving the torch 6 with the welding wire 4 being projected therefrom by a predetermined length and by touching the wire 4 with the work 9 is well known to the personnel skilled in the art. Therefore, the detailed explanation is omitted for the sake of brevity.

The "wire sticking" is caused as follows. At the termination of the welding operation, the welding wire 4 is continually fed toward the work 9 due to the inertia moment of the wire feeding units. In such a situation, when the welding power from the welding power source unit 2 is relatively low, it is impossible to generate a strong arc enough for fusing the wire 4 in a speed greater than that of the wire 4 fed by that inertia moment. Then, the tip of wire 4 becomes in contact with a pool of molten metals formed in the work 9, and makes a short circuit therebetween. This phenomena is referred to as the "wire sticking."

Next, the detection of "wire contact" condition is described herebelow. When the welding start signal Sws is not taken place, meaning that the robot 7 is not performing the welding operation, the resistance uncoupling relay CRb is not actuated. Therefore, a relay contact CRb2 connected in series with the resistance 13 is open. Therefore, the resistance 13 is uncoupled from the power supplying circuit. On the other hand, since a relay contact CRb1 is closed, the relay MS can be controlled only by the wire contact detector switching signal Ssw actuating the contact 11 for switching the wire contact detector 26.

However, when welding start signal Sws is taken place, meaning that the robot 7 is just performing the welding operation, the resistance uncoupling relay CRb is actuated by the signal Sws to close the contact CRb2. Thus, the resistance 13 is electrically inserted in the power supply circuit in series connection. Since the relay contact CRb1 is opened, the wire contact detector switching signal Ssw can not controls the wire contact detector switching relay MS. Therefore, the contacts MSa are open so that the internal resistance 13 is uncoupled from the welding power supply circuit regardless of the signals Ssw and Swc. Thus, the arc welding system Wp utilizes the welding start signal Sws, and always uncouples the resistance 13 inside the welding power source unit 2 during non-welding operation.

As best shown in FIG. 3, the wire contact detector 26 is connected to both ends of resistance 13, as being inserted between the welding wire 4 and work 9. During the non-welding operation, the resistance 13 is uncoupled from the welding power supply circuit by the relay contact CRb2, as described above.

Next, the first robot controller 25 closes the contact 12 by the wire contact detection signal Swc so that the high DC voltage is applied to the welding power circuit via the resistance 14 connected with the resistance 13 in series. This contact 12 is kept closed until the welding wire 4 contacts with the work 9 during the "work position" sensing operation, and is pulsated (momentary closed and opened again) when the "wire sticking" at the termination of welding operation or the "torch contact" is detected.

It is meant that the welding system Wp is not under the welding operation when the welding wire 4 and work 9 are in contact with each other. Therefore, the internal resistance 13 is uncoupled from the welding power supply circuit, resulting that an electric voltage Vc detected at the junction point 15 becomes zero volt. When the welding wire 4 and work 9 are not in contact with each other, the resistance 13 is uncoupled from the output terminals 27 and 28. Therefore, the same voltage as that at the resistance 14 is applied to the point 15 as the voltage Vc. Thus, the voltage Vc changes according to the condition on which the welding wrier 4 and work are in contact with each other, and is referred to as a "wire contact voltage" in this sense.

As described in the above, when the wire 4 contacts with the work 9, the voltage Vc reduces to about zero volt. The comparator 17 compares this voltage Vc at the point 15 with a reference voltage Vr which is adjustable by a suitable means such as a adjustable resistor, and outputs its comparison result to a transistor Q1.

When the wire contact voltage Vc is smaller than the reference voltage Vr, the comparison result has a HIGH level. Therefore, the transistor Q1 turns on so that the relay CRa also turns on. Then, the contact CRa1 of the relay CRa closes to connect the lines extended from the first controller 25, resulting in the voltage drop therebetween. Thus, the first controller 25 detects that the wire 4 and work 9 are in contact based on the voltage Vwc. Based on this wire contact detection, the control unit 25 turns the signal Ssw to LOW level so that the contact 11 opens to uncouple the wire contact detector 26 from the inner resistance 13.

In the case that the voltage of 24V is applied to the resistance 14 while the welding wire 4 and work 9 are not in contact with each other, the reference voltage Vr is preferably set to about 12 Volt because of that the resistance 13 is uncoupled from the power supply circuit. Specifically, according to this embodiment, it is only have to judge whether the external impedance is infinity or zero Ω, resulting the accurate and secured operation.

Figure 4:
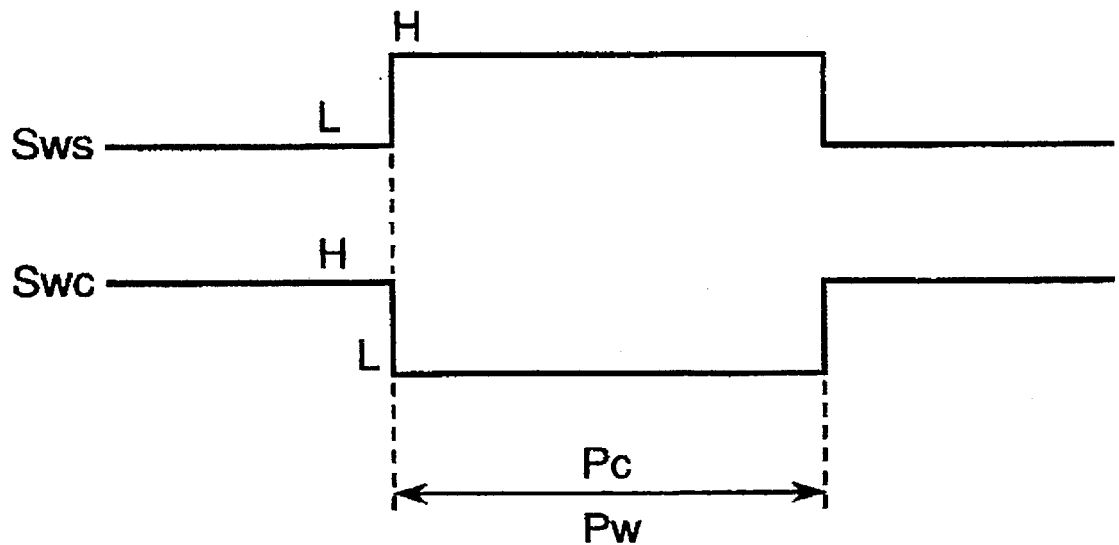
FIG. 4 is a graph showing the relationship between the welding start signal and the wire contact detecting operation according to the present invention.
Figure 9:
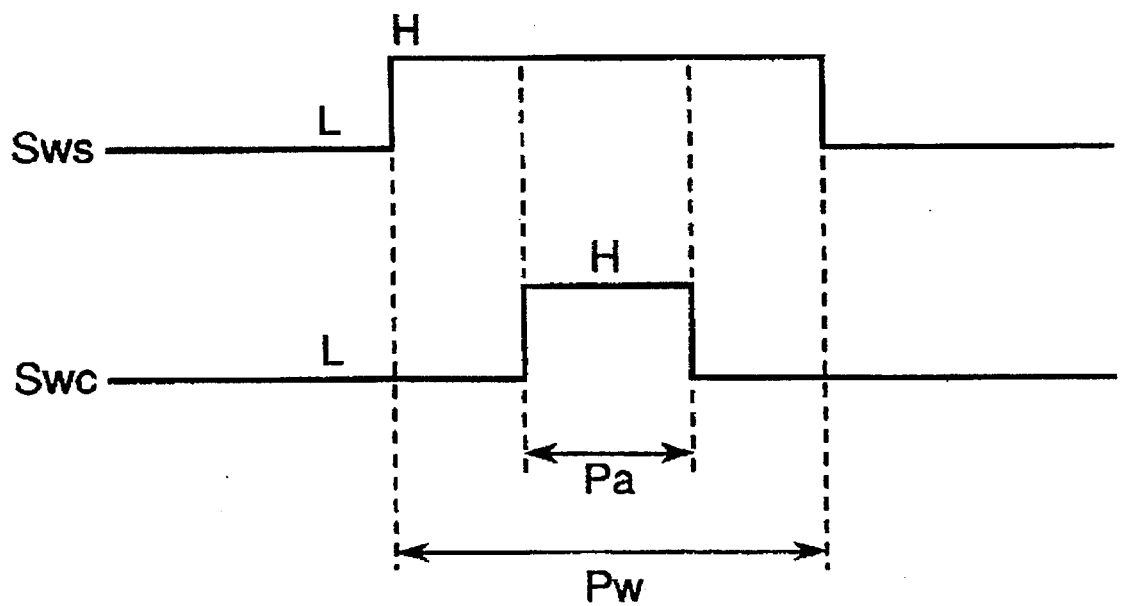
FIG. 9 is a graph showing the relationship between the welding start signal and the wire contact detecting operation according to the conventional arc welding system of FIG. 7.

Referring to FIG. 4, the welding start signal Sws and the wire contact detection start signal Swc observed in the arc welding system Wp are shown. Specifically shown, a high level period Pw of the welding start signal Sws and a low level period Pc of the wire contact detection start signal Swc completely overlap. In other words, both the signals Sws and Swc will not be HIGH at the same time. This is apparent from the above description that even if the second controller 30 placers a instruction to perform the wire contact detection during the welding operation in error, only one side of welding power voltage or wire contact detection voltage may be applied between the positive and negative sides of the welding power output. Therefore, no burning will be available.

Figure 5:
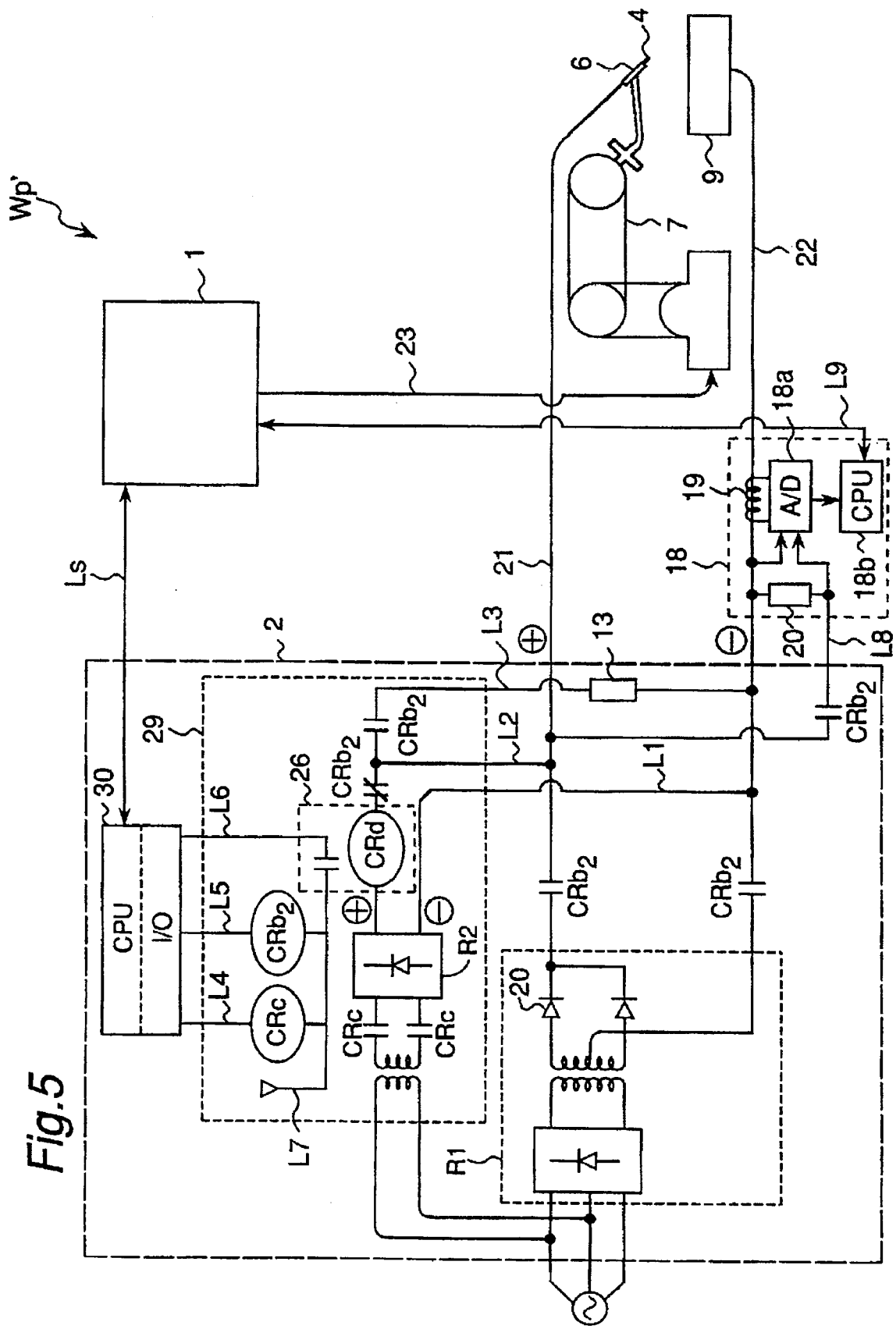
FIG. 5 is a block diagram showing an alternative of the arc welding system of FIG. 1.

Referring to FIG. 5, an alternation of the arc welding system of FIG. 2 is shown. This arc welding system Wp' additionally includes an arc welding sensor unit 18 connected to the control unit 1 by a line L9 and to the welding power source unit 2 by a line LB. The welding power source unit 2 also additionally includes a contact CRb of the relay CRb having one end connected to the line L8 extending from the sensor unit 18 and another end connected to the torch cable 21 by a line L7.

The arc welding sensor unit 18 has a welding voltage detection resistance 20 having one end connected to the torch cable and another end connected to the line L7. An analogue to digital (A/D) converter 18a having two input terminals connected to the resistance 20 through the torch cable 21 and the line L8, respectively, for detecting the voltage applied to the resistance 20. A current detection coil 29 is provided around the torch cable 22 for detecting the electric current flowing therethrough. Each end of the coil 19 is connected to each of further two input terminals of the A/D convertor 18a. Thus, the signals indicative of the voltage and current at the work line 22 are converted into digital data. A CPU 18b is connected to the A/D converter 18a for receiving such digital data therefrom to detect the condition of arc welding operation. The CPU 18b is connected to the controller 1 for exchanging the data though the line L9.

Figure 6:
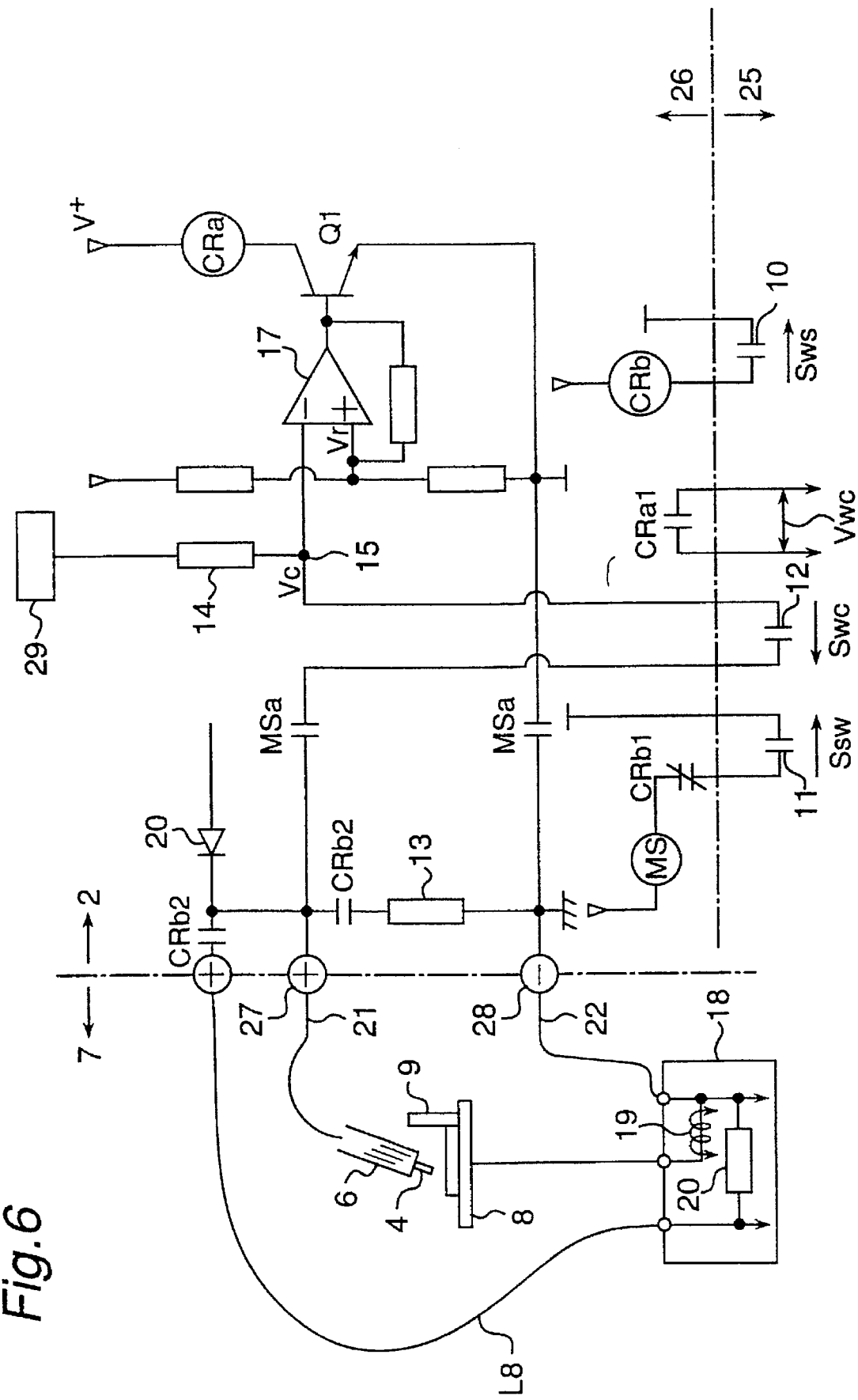
FIG. 6 is a schematic diagram showing the essential portions of the arc welding system of FIG. 5.
Figure 7:
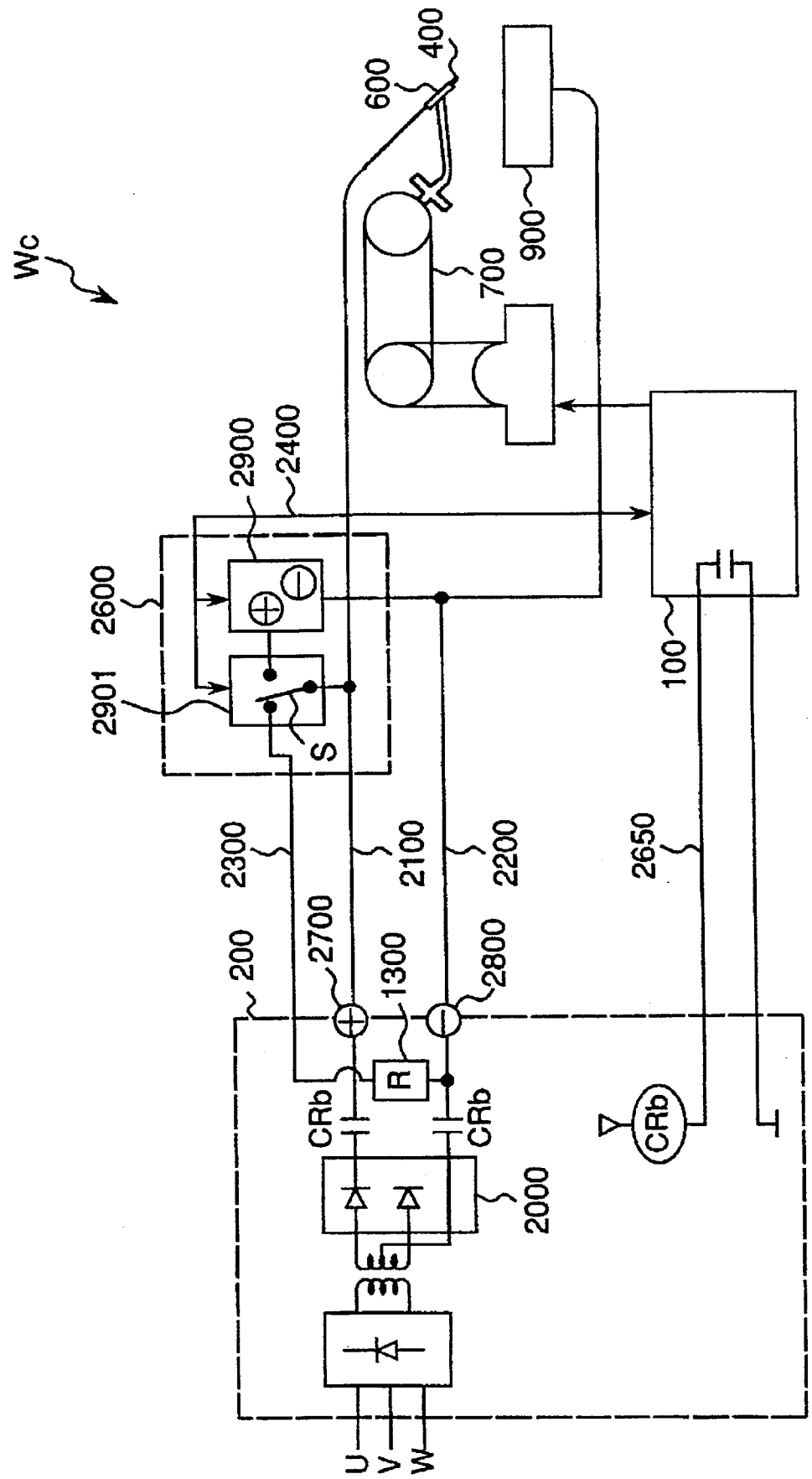
FIG. 7 is a block diagram showing a conventional arc welding system.
Figure 8:
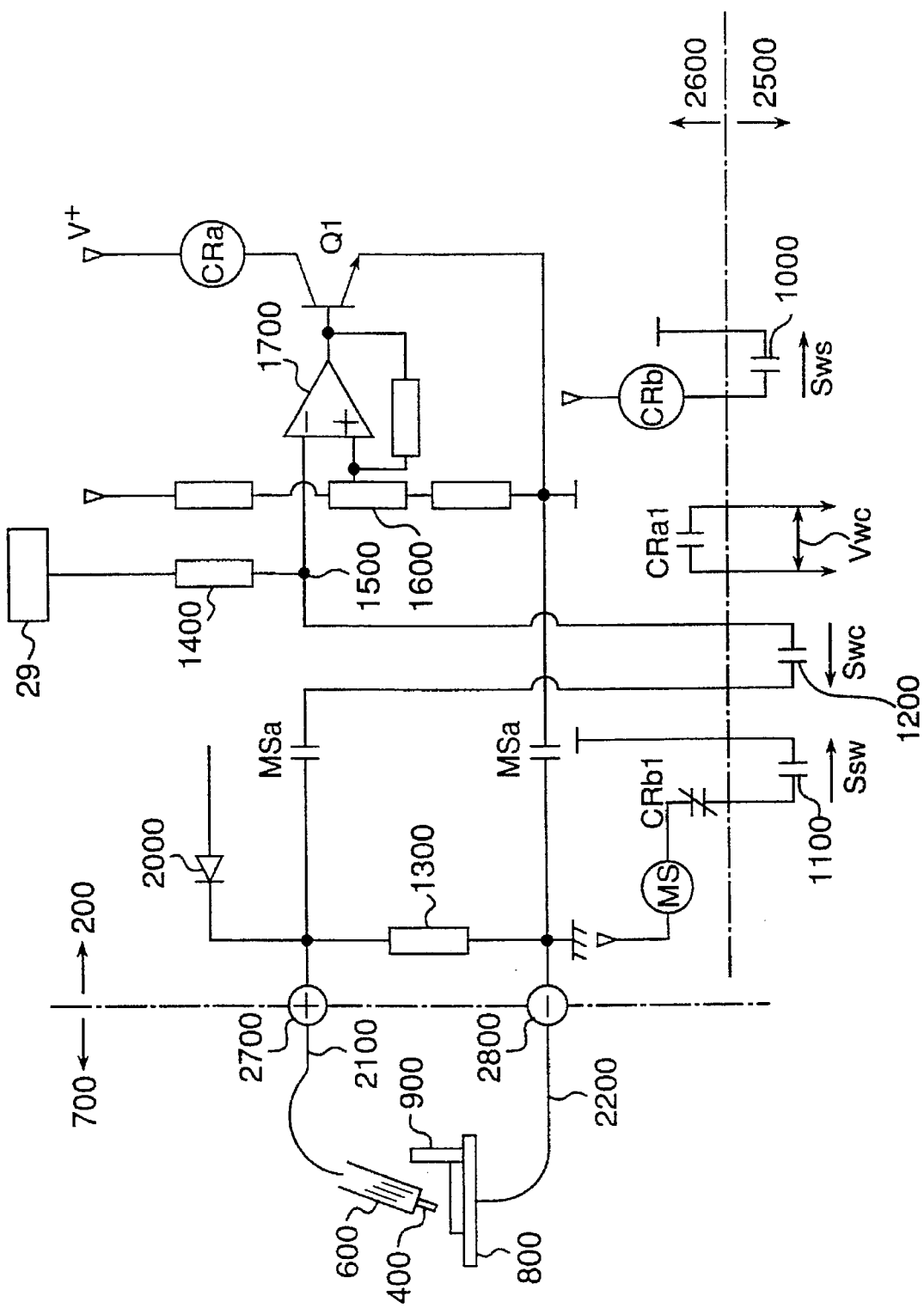
FIG. 8 is a schematic diagram showing the essential portions of the conventional arc welding system of FIG. 7.

Referring to FIG. 6, the essential parts of the arc welding system of FIG. 5 is shown schematically. As described above, the arc welding sensor unit 18 showing the voltage and current detecting elements 20 and 19 are additionally provided to the system Wp of FIG. 3. Hereinafter, the operation of thus constructed welding system Wp' will be described mainly with respect to such additionally provided elements.

The welding sensor unit 18 is provided for detecting the changes of welding current and welding voltage during welding operation by the robot 7. For example, based on such changes in voltage and current detected when the welding wire 4 is weaved by the robot 7 or rotated at a speed of about 50 Hz by suitable rotating mechanism, the Robot 7 is controlled to follow an optimum welding path.

As shown in FIGS. 5 and 6, the resistance 20 is connected between the positive terminal 27 and the negative terminal 28, the current detecting element 19 is inserted in a cable connecting the base metal 8 and the positive terminal 28. According to thus constructed sensor unit 18, a sub circuit is formed in the welding power circuit of the unit 2. Therefore, it is necessary to uncouple the resistance 20 from the welding circuit at the same time when a DC voltage is applied between the terminals 27 and 28 for judging whether the wire 4 and work 9 are in contact with each other, or not. For this purpose, this welding system Wp' is additionally provided with the relay contact CRb that opens on receipt of the welding start signal Sws. Thus, even if the welding start signal Sws is placed in error during the contact detection by applying a DC voltage between the terminals 27 and 28 of the welding power source, the resistance 20 is uncoupled simultaneously.

As apparent form the above, according to the present invention, not only the internal resistance 13 but the external resistance 14 are uncoupled from the welding circuit. Then, the generator of sub circuit are prevented, and it is secured that the welding system can operated free from misoperation due to the mixing the high voltage welding power.

It is needless to say that it is not limited to the arc sensor unit 18 that is to be uncoupled, and any element connected between the both terminals 27 and 28 are preferably uncoupled for the secured operation without operation error.

As described in the above, the internal resistance 13 is uncoupled from the welding power circuit by the relay CRb driven by the welding start signal Sws. Since this relay CRb is incorporated in the welding power source unit 2, no additional and bothersome wiring works at the installation site are not required. Thus, the manufacturing cost and installation cost as well as the installation space can be reduced according to the present invention.

In addition to this, it is to be noted that the wire contact detector 26 itself can be incorporated in the welding power source unit 2 according to the present invention. Therefore, the cost and space reduction will be greater.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A welding power source for use in a welding system for welding a workpiece by fusing a welding wire, said source comprising:

a power generator means for supplying said welding wire and said workpiece with an electric power to fuse said welding wire;

a resistance means coupled to said power generator means; and a coupling means for coupling said resistance means to said power generator means only while said welding system is performing a welding operation.

2. A welding power source as claimed in claim 1, further comprising a control means for controlling said welding system.

3. A welding power source as claimed in claim 2, wherein said control means generates a signal for controlling said welding system to weld said workpiece with said welding wire, and said coupling means couples said resistance means to said power generator means while said signal is generated.

4. A welding power source as claimed in claim 1, further comprising:

terminal means for conducting the electric power to the welding wire and the workpiece; and a coupling means for coupling said terminal means to said power generator means while said welding system is performing the welding operation.

5. A welding power source for use in a welding system for welding a workpiece by fusing a welding wire, said source comprising:

a first power generator means for supplying said welding wire and said workpiece with a first electric power to fuse said welding wire;

a first resistance means coupled to said first power generator means;

a second power generator means for supplying said welding wire and said workpiece with a second electric power for detecting a contact of said welding wire with said workpiece; and a coupling means for selectively coupling said first resistance means to said first power generator means only while said welding system is performing a welding operation to prevent said first electric power from interfering with said second electric power.

6. A welding power source as claimed in claim 5, further comprising:

terminal means for conducting the electric power to the welding wire and the workpiece; and a coupling means for coupling said terminal means to said first power generator means while said second electric power is being supplied to said welding wire and said workpiece.

7. A welding power source for use in a welding system for welding a workpiece by fusing a welding wire, said source comprising:

power generator means for supplying said welding wire and said workpiece with an electric power to fuse said welding wire;

resistance means selectively coupled to said power generator means;

control means for generating a control signal for selectively applying said electric power to said welding system; and coupling means responsive to said control signal for coupling said resistance means to said power generator means only while said welding system is performing a welding operation.

8. A welding power source as claimed in claim 7, further comprising:

terminal means for conducting the electric power to the welding wire and the workpiece; and second coupling means responsive to said control signal for coupling said terminal means to said power generator means while said welding system is performing the welding operation.

* * * * *